Nov. 18, 1958   J. C. KUDAR   2,860,542
CONTINUOUS MOTION PICTURE APPARATUS, COMPOSITE PRISM
Filed Oct. 30, 1953
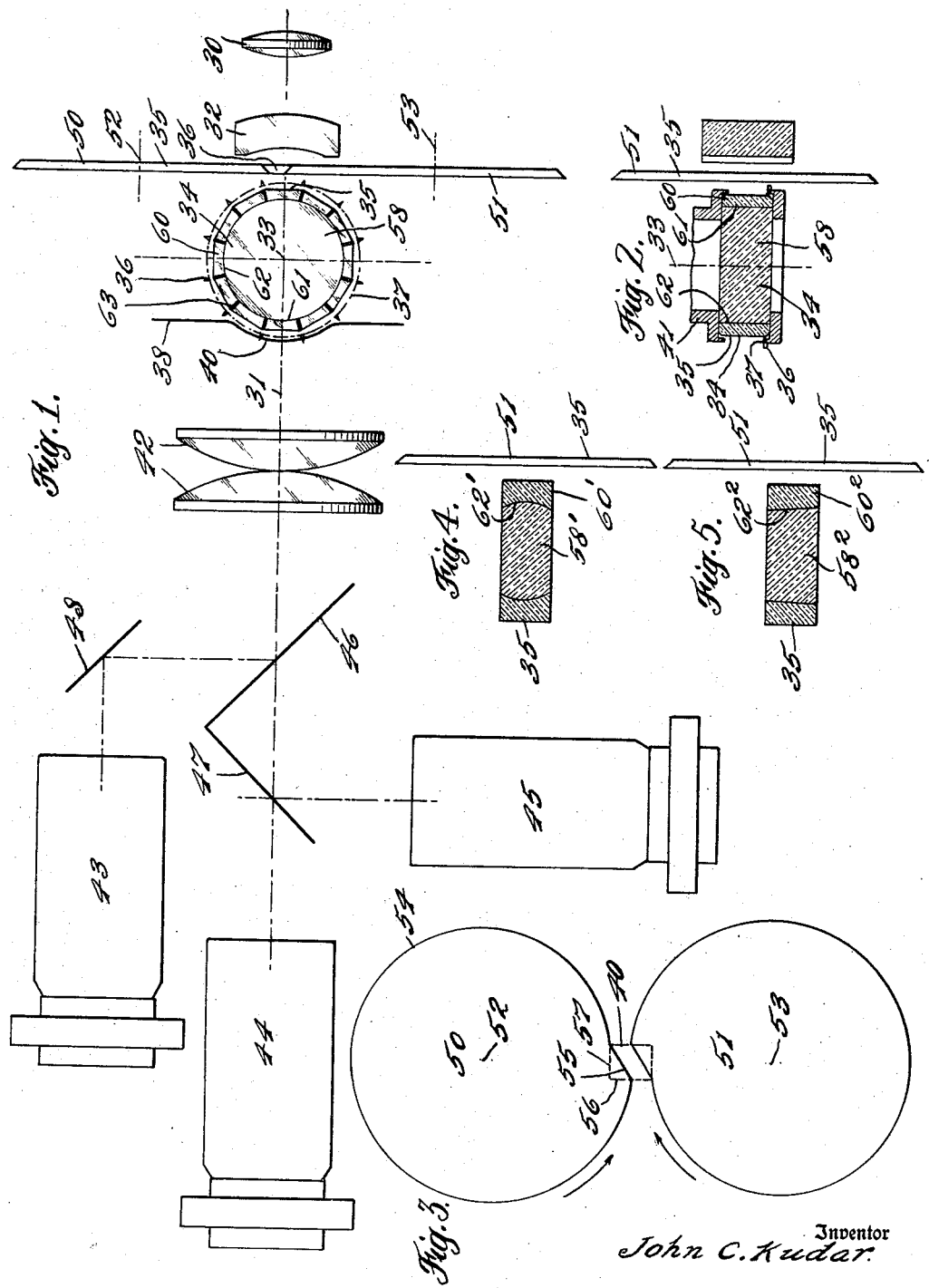
Inventor
John C. Kudar.
By
Attorneys

2,860,542

CONTINUOUS MOTION PICTURE APPARATUS, COMPOSITE PRISM

John C. Kudar, Philadelphia, Pa.

Application October 30, 1953, Serial No. 389,257

1 Claim. (Cl. 88—16.8)

The present invention relates to a continuous motion picture apparatus of the character which may be used as a projector or as a camera, and is particularly suited for the transmission of color motion pictures by television.

A purpose of the invention is to obtain more precise optical surfaces on a polygonal prism while simplifying the problems of construction and reducing the cost.

A further purpose is to employ the principles of interchangeable parts in the construction of a rotating polygonal prism, and avoid accumulation of errors in production, and creation of abnormalities of image due to deviations of individual facets of the prism from production standards, or the presence of individual facets which are at or near opposite ends of the tolerance range.

A further purpose is to permit selective fitting of components in the construction of a rotating polygonal prism so that controlled methods of production and quality control procedures can be applied to the manufacture of such elements.

A further purpose is to employ in a polygonal prism a spherical core with lens elements formed facets of a high index of refraction and without the presence of appreciable air gap.

A further purpose is to create a rotating polygonal prism having optical elements of two different indexes of refraction, which is self compensating to achieve optical immobilization without introducing cylindrical astigmatism in a part of the optical system, thus avoiding the need for correction for cylindrical astigmatism.

Further purposes appear in the specification and in the claim.

In the drawings I have chosen to illustrate a few only of the numerous embodiments in which my invention may appear, selecting the forms shown from the standpoints of convenience in illustration, satisfactory operation and clear demonstration of the principles involved.

Figure 1 is a diagram showing one desirable embodiment of the invention applied to a color television film transmitter.

Figure 2 is a plan section of Figure 1 on the optical axis.

Figure 3 is a diagrammatic end elevation of a rotating stop which may desirably be used in the present invention.

Figure 4 is a view corresponding to Figure 2 showing the invention applied to a polygonal prism whose core has a spherical surface of revolution.

Figure 5 is a view corresponding to Figure 2 showing a polygonal prism whose core has a conical surface of revolution.

In the prior art practice efforts to make an effective rotating polygonal prism consisting of a single solid piece of glass have met with serious difficulty due to the fact that optical glasses of adequately high refractive indexes have generally not been obtainable in large sizes and in material of consistent quality. It has, therefore, frequently been necessary to use solid prisms which are inter- geared to the film sprocket in order to obtain the desired rotational speed, thus introducing irregularities of movement due to backlash of gearing and through mechanical difficulties.

By the present invention, it is possible to obtain a very effective rotating polygonal prism which in one form of the invention can immobilize the image without introducing cylindrical aberration and therefore without creating difficulty through the correction of such aberration.

The invention is also applicable to facilitate the mass production of polygonal prisms of composite type, employing a core of low index of refraction, and lens elements forming the facets of higher index of refraction in accordance with my copending U. S. patent application Serial No. 351,436, filed April 27, 1953, for Continuous Motion Film Apparatus and Method. By the present invention in particular, it is possible to eliminate altogether air gaps between the core and the lens elements forming the facets, and to obtain many advantages of mass production. Thus the lens elements for the facets can be produced as interchangeable parts, and by virtue of the increased number of repetitive operations, the process can be particularly under control from the standpoint of quality control. Furthermore, lens elements which are beyond a reasonable tolerance range can be rejected without destroying the entire prism. Also, care can be used to avoid grouping together lens elements which are at opposite extremes of the tolerance range, and if desired selective fitting can be employed arranging all of the lens elements for a particular prism into sets which are closely similar in dimensions.

In accordance with the invention the core comprises an optical element which may permissibly be a cylinder, a portion of a sphere, or a portion of a cone slightly different from a cylinder. The axis of the cylinder or cone and the center of the sphere is located at the axis of rotation of the prism, so that the curved surface of the cylinder, cone or sphere forms a surface of revolution about the axis of the prism. The optical elements at the outside are in effect lens which form the facets, and are arranged in opposed pairs so that the light beam passing through the polygon will at the optical axis pass through one lens element, then the core and then the other lens element.

Each of the lens elements is in effect a concavo-plano lens, the plano surface being external and parallel in each opposed pair, and being transverse to the optical axis when the facets are central at the optical axis.

The concavo interior surface conforms to the surface of revolution of the core, and these surfaces are intimately united by a suitable optical cement such as Canada balsam, so that no air gaps exist and the lens-like facet elements are rigidly united to the core.

Each one of the facets is preferably separated from the next by an opaque wall which may desirably be obtained by blackening the end wall of one or both of the adjoining lens elements.

Considering first the form of Figures 1 to 3 inclusive applied to the televison broadcasting of color films, a polychromatic source of light (not shown) at the right in Figure 1, suitably a flying spot scanner, cathode ray tube, or the like, passes light through a projection lens 30 along the optical axis 31, and then through an external correcting lens 32, which in the present instance takes the form of a concentric cylindrical meniscus lens whose axis is at 33, at the rotational axis of the prism to be described. Interposed between the lens 32 and a polygonal prism 34, is a lens stop 35 having an opening 36.

Depending upon the character of the device, the lens stop may be a fixed stop or preferably a travelling stop which shifts in position as the facets of the prism turn. The prism 34 may take one of several forms according to the present invention, as later explained, and has at the outside a plurality of opposed plane parallel facets 35 arranged in opposed pairs, so that at any position on the optical axis, there are always opposed facets in line. The number of facets will vary from 12 upward, and will preferably be in excess of 16, and desirably of the order of 20.

On one or both sides, depending upon the place of perforating the particular film, and rigidly secured to the prism, there are teeth 36 of a film rotating sprocket 37 which is coaxial with the prism. The film 38, may take any desired path at an illuminated central gate 40, but will, for convenience in illustration, follow the sprocket curvature, as illustrated, guided by feed rollers. Various other film paths which are preferable for particular situations are shown in my co-pending application, Serial No. 389,256, filed October 30, 1953, for Continuous Motion Picture Projection Film Path.

The sprocket or sprockets and the prism are rotatably mounted in a rotatable support 41 which turns about the same axis as the axis of the prism and the sprocket.

Light passing through the film is carried through condenser lenses 42, and distributed to monochromatic photo-electric pickups 43, 44 and 45 by dichroic mirrors 46 and 47, and ordinary mirror 48 as well known. The photo-electric pickups control the broadcast of the respective color signals by the television station.

In one form of stop, as best seen in Figure 3, two rotating discs of spiral periphery are located in the same plane transverse to the optical axis. An upper disc 50 and a lower disc 51 turn at the same speed in opposite directions on the respective axes or shafts 52 and 53. One of the discs is placed above the optical axis 31 and the other disc is placed below the optical axis, and they are suitably interconnected as by external gearing. Each of the discs has an edge 54 conforming to a spiral whose pitch corresponds to the height of one facet of the polygonal prism. At a position in which the relatively larger and the relatively smaller radius of the spiral are about to overlap, there is on each spiral an abrupt preferably straight edge 55 which is desirably in length, angularity and position the diagonal of the facet of the polygonal prism, so that the projected height 56 of the diagonal edge 55 is of the order of magnitude of the height of one frame of the film and the projected width 57 is of the order of magnitude of the width of the frame of the film.

Figure 3 shows the positions of the two discs of the travelling stop at the moment when the edge between two polygonal facets crosses the optical axis. One full rotation of the spiral periphery of the discs is completed while the polygon is turned by an angle corresponding to one facet. When using this traveling stop, a film gate 40 or illuminated zone on the film having a height of two frames, must be left constantly open, and the projection lenses must have an aperture at the changeover position in which an equivalent stationary rectangular stop would cover approximately two prism facets.

The travelling stop makes possible the full benefits of isotransport of the film, because the travelling stop causes consecutive frames to replace one another in the manner of a fast wipe, while the stationary stop requires combining the consecutive frames in a continuous fade-in and fade-out.

In accordance with the present invention, the polygonal prism 34 comprises a central core 58 of glass or other optical material, and lens elements 60 cemented to the core at 61 around the circumference forming the individual facets.

The core 58 has an outside surface of rotation about the polygon axis, or, as it is more commonly called in mathematics, a surface of revolution, and which in the form of Figures 1 and 2 is a cylinder side wall 62. This surface of revolution may take other forms, and in Figure 4 at 58' the core has a surface of revolution 62' which is a portion of a sphere whose center is in the axis of rotation of the prism. In the form of Figure 5, the core $58^2$ has an outside surface of revolution which is a portion of a cone $62^2$.

In each case, the lens elements 60, 60' or $60^2$ conform to the surface of revolution of the core, so that in the form of Figures 1 and 2, the lens elements have internal surfaces which conform to the cylindrical surface 62, while in the form of Figure 4, they have internal surfaces which conform to the spherical surface 62' and in the form of Figure 5, they have internal surfaces which conform to the conical surface $62^2$. The form of Figure 5 has the slope of the cone exaggerated beyond that which would probably be used commercially.

The outside opposed faces of the lens elements form plane facets 35 which are parallel (in pairs) in opposed relation, and at the center are transverse to the polygon radius, and to the optical axis in symmetrical position. Thus due to the cementing of the lens elements on the core and the very close fit between the lens elements and the core, there is no air gap between the lens elements and the core.

In accordance with the present invention, the core has a relative lower refractive index, and the lens elements have a relatively higher refractive index. Thus the polygonal prism is a solid prism having no air gap, but different refractive indexes in inner and outer elements.

If a hollow polygonal prism is made of a piece of glass, and an attempt is made to fill the cavity by a solid glass core, the boundary surface of revolution between the polygon and the core may be either a cylinder or a cone, but it will be impractical to fit a spherical core into a spherical hollow prism without leaving a large air gap. Furthermore, the manufacture of such a hollow prism with high tolerance on the facets, and on the internal surface of revolution is very difficult and usually expensive.

A spherical boundary between the polygon and the core, as shown in Figure 4, has one advantage as it is free of astigmatism of the kind that is caused by a cylindrical boundary surface between the polygon and the core. Therefore, it is not necessary, in the form of Figure 4 to use an external lens 32 to correct astigmatism.

According to the new method of manufacturing the polygon in accordance with the invention, a core is first machined from optical glass or other optical material having an external surface of rotation which may be a cylinder, a portion of a sphere, or a cone, as indicated. Then a number of plane-concave lens elements are produced which have the same internal curvature as the outside of the core and the correct flat facet surfaces. The edges are preferably radial and the ends straight. Since these lens elements are made in relatively large numbers, they can be manufactured to high tolerance, and if one fails to meet the tolerance, it does not spoil the entire prism. Furthermore, selective fitting may be used to assure that the adjoining facets are generally in the same range of the tolerance band.

These peripheral components are then cemented on to the surface of revolution of the core, placing them very accurately in circumferential position as by jigs. This process of optical cementing can be done with high precision. Each of the lens elements must be placed accurately in relation to its relative angular position to adjoining lens elements, and then placement can be assisted by wedges between the lens elements, if desired.

In order to prevent transmission of light through radial edge surfaces of the lens elements, the radial edges are desirably coated with opaque material, such as paint at 63, thus making each lens element optically separate until the core is reached.

The geometrical and optical properties of the polygon prism may be expressed as follows:

$$\frac{2n_2t_1+D}{D(n_2-1)}=1+\frac{2n_2t_1+D}{R_1}\cdot\frac{n_2-n_1}{n_1}$$

in which $D$=flat-to-flat thickness between opposed facets of the polygon.

$t_1$=distance between the film and the adjoining polygon facet.

$R_1$=radius of the core and of the cavity of the lens elements. In the case of a cylindrical core, this is a cylindrical radius; in the case of a spherical core, it is the spherical radius; and in the case of a conical core, it is the average conical radius.

$n_1$=refractive index of the core.

$n_2$=refractive index of the lens elements.

$t_2$=thickness of the lens elements measured radially at their thinnest point, in the case of a cylinder or sphere; and in the case of a cone, it is the average thickness measured radially at the middle of the lens element.

The lens elements are really thin lenses in which the thickness is of the order of 2 mm., in order to prevent vignetting effects which may be caused by the edge-to-edge junctions of the peripheral components, while the distance of the film to the adjoining polygonal facets should be kept small, approximately 1 mm. in this form.

If however, greater distances between the film gate and the polygon are to be employed, the optical design should be modified to consider this factor.

One advantage of the present invention is that high index glass of low dispersion, such as Eastman Kodak 448, is most readily available in small sizes, and such high index glass can be used for lens elements in connection with polygons for 35 mm. film projection, as well as for 16 mm.

In view of my invention and disclosure variations and modifications to meet individual whim or particular need will doubtless become evident to others skilled in the art, to obtain all or part of the benefits of my invention without copying the structure shown, and I therefore, claim all such insofar as they fall within the reasonable spirit and scope of my claim.

Having thus described my invention, what I claim as new and desire to secure by Letters Patent is:

An optical device comprising a source of light, a rotatable polygonal prism located in the path of the light and having a transparent core of solid material, rotating with the rest of the prism and which core has, in the light path, circumferential surfaces spherically curved about a center located on the axis of rotation of the prism, the prism having also, affixed on the outside of the core, a series of individual plano-concave lens elements having the concave side inward with a spherical curvature substantially identical to that of the core having their edges near each other substantially radial, and having their plane faces symmetrically positioned about the core with each paired with another opposite thereto to form a regular polygon having a series of plane facets, the light path being continuously through solid transparent material between facets, the lens elements being all of substantially the same refractive index which is substantially different from and higher than that of the core, and the prism having radial opaque strips between neighboring radial edges of the lens elements, and film sprockets mounted rigidly on the outside of the prism to rotate therewith and hold successive films in a film strip opposite successive prism facets in the light path, the different components being interrelated substantially in accordance with the following equation:

$$\frac{2n_2t_1+D}{D(n_2-1)}=1+\frac{2n_2t_1+D}{R_1}\cdot\frac{n_2-n_1}{n_1}$$

in which $D$=flat-to-flat thickness between opposed facets of the polygon.

$t_1$=distance between the film and the adjoining polygon facet.

$R_1$=radius of the core and of the cavity of the lens elements.

$n_1$=refractive index of the core.

$n_2$=refractive index of the lens elements.

$t_2$=thickness of the lens elements measured radially at their thinnest point.

References Cited in the file of this patent

UNITED STATES PATENTS

| | | |
|---|---|---|
| 603,771 | Maskelyne | May 10, 1898 |
| 1,928,988 | Bledowski | Sept. 26, 1933 |
| 2,402,216 | Vennigerholz | June 18, 1946 |
| 2,522,390 | McCarthy | Sept. 12, 1950 |
| 2,543,463 | Malm | Feb. 27, 1951 |

FOREIGN PATENTS

| | | |
|---|---|---|
| 517,472 | Great Britain | Jan. 31, 1940 |
| 803,196 | Germany | Mar. 1, 1951 |